Sept. 13, 1927.  A. C. MOORE  1,642,080
BRAKE BEAM SUPPORT
Filed Aug. 21, 1923   3 Sheets-Sheet 3
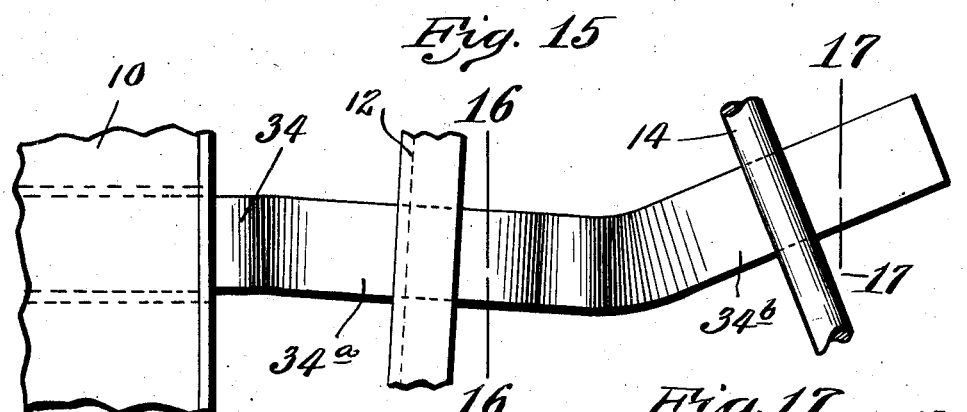
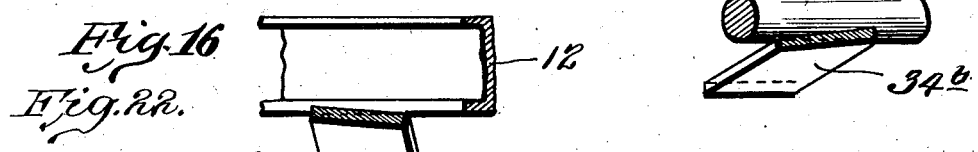
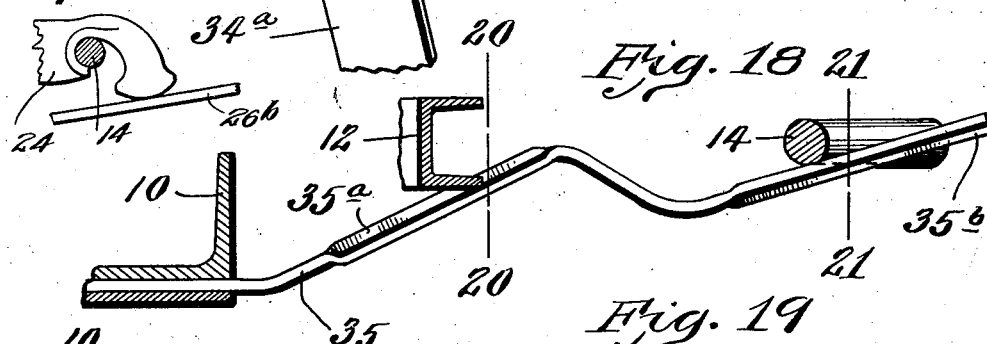
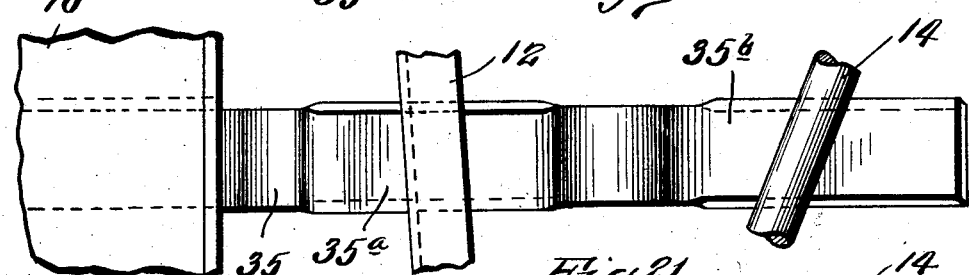
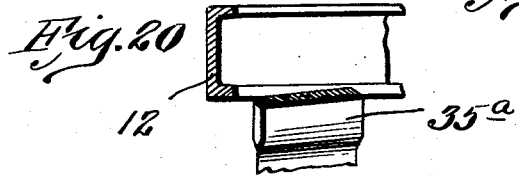
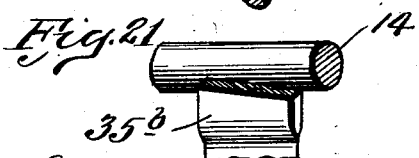

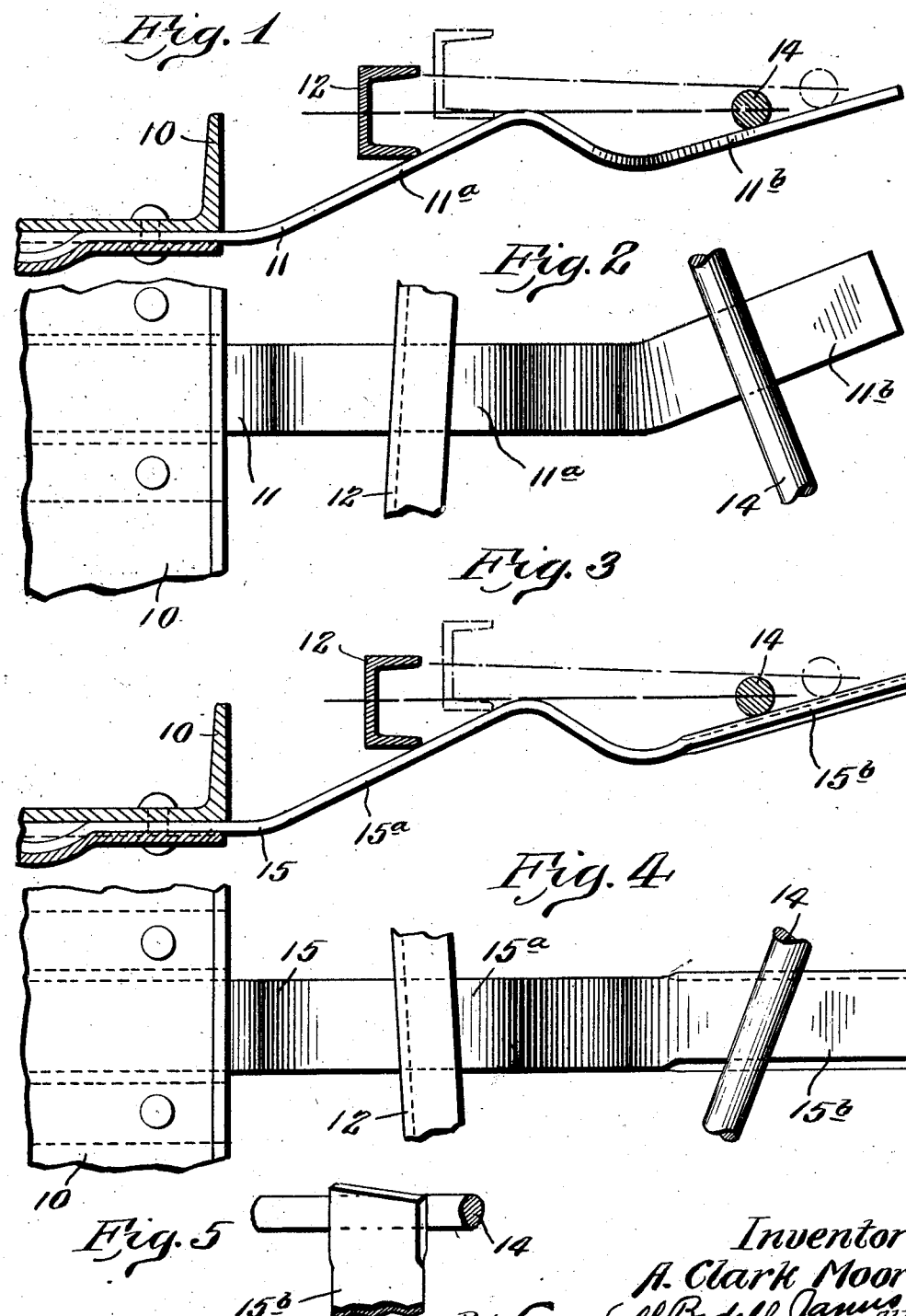

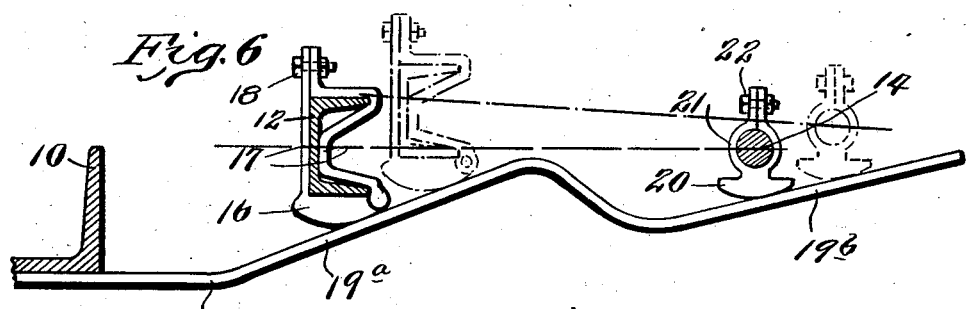
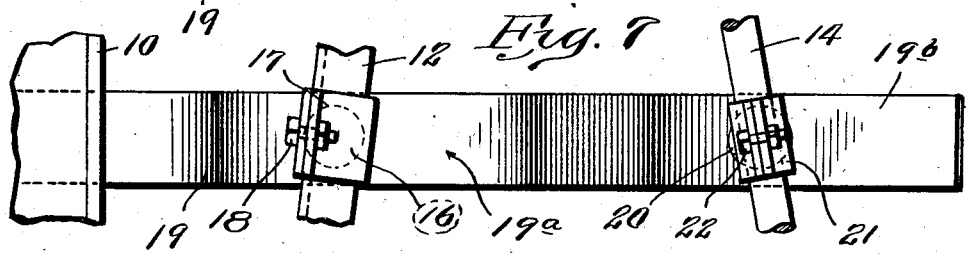
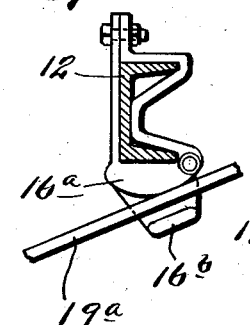
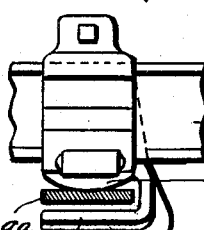
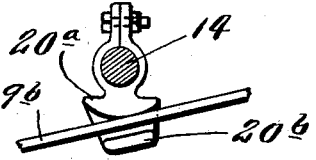
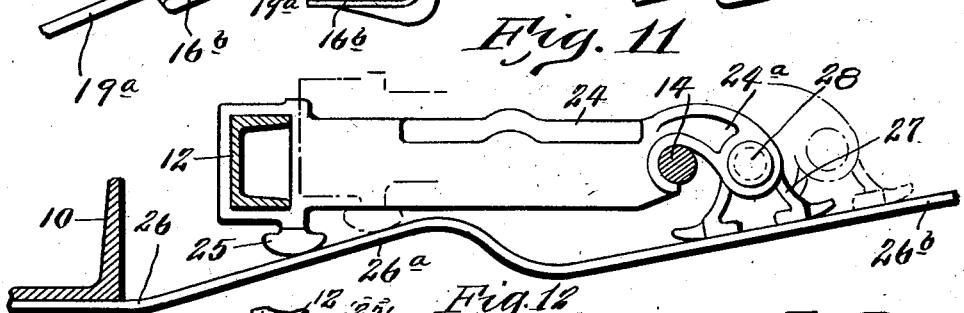
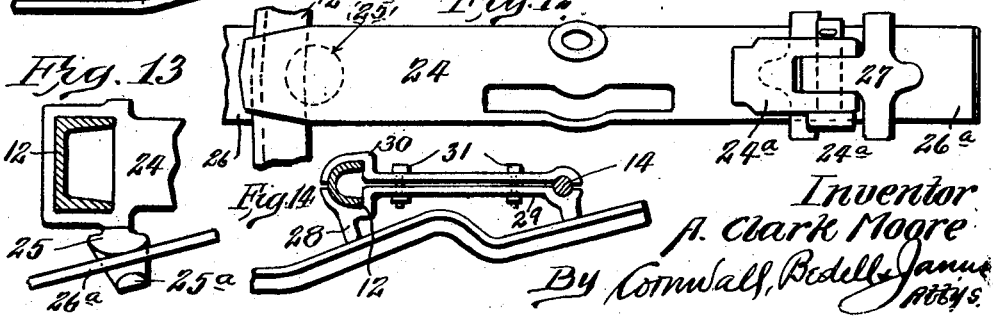

Patented Sept. 13, 1927.

1,642,080

UNITED STATES PATENT OFFICE.

AMBROSE CLARK MOORE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM SUPPORT.

Application filed August 21, 1923. Serial No. 658,578.

This invention relates generally to new and useful improvements in car truck construction and particularly to improvements in third and fourth point supports for brake beams.

The objects of the invention are to provide a support or safety bar having a plurality of inclines or sloping track portions arranged in the path of movement of the brake beam and designed to be engaged thereby at points coincident with its compression member and its tension member so that the brake beam and brake rigging associated therewith are guided and maintained in proper operative position relative to the wheels of the truck.

Further objects of the invention are to so form the sloping track portions that their inclinations vary with respect to each other in order to correspond with the vertical movements of the respective members, the rise of the compression member being more abrupt than that of the tension member.

Still further objects of the invention are to provide improved means carried by the brake beam for slidingly engaging the track portions of the safety bar and provided with means extending under said safety bar and adapted to prevent the accidental upward displacement of the brake beam.

With the foregoing and other objects in view, my invention consists in certain novel features of construction and arrangement of parts hereinafter more fully described and claimed, and illustrated in the accompanying drawings, in which—

Figure 1 is a side elevation of the safety bar attached to a part of the truck, and used as a fourth point support.

Figure 2 is a plan view of the same.

Figure 3 is a side elevation of a modified form of support or safety bar.

Figure 4 is a plan view of the same.

Figure 5 is an end elevational view of the modified form of safety bar shown in Figures 3 and 4.

Figure 6 is a side elevational view of the safety bar showing the compression member and the tension member provided with shoes for engaging said bar.

Figure 7 is a plan view of the same.

Figure 8 is a side view of a modified form of shoe having a downwardly and laterally extending lip portion adapted to engage the underside of the track for preventing the upward accidental movement of the compression member.

Figure 9 is an end elevational view of the same.

Figure 10 is a modified form of the shoe as applied to the tension member.

Figure 11 is a side elevational view of the safety bar and used as a third point support.

Figure 12 is a plan view of the strut and the third point support member.

Figure 13 is a fragmental detail view of the compression member end of the strut and showing the sliding shoe thereof provided with a lip portion for engaging the underside of the support.

Figure 14 is a detail view showing the chairs formed integral with a suitable member which is clamped to the respective members of the brake beam.

Figure 15 is a plan view of a modified form of a support wherein the track member is formed with two divergent portions in order to properly engage and support the angularly disposed parts of the brake beam.

Figure 16 is a vertical cross section taken on line 16—16 of Figure 15.

Figure 17 is a vertical cross section taken on line 17—17 of Figure 15.

Figure 18 is a side elevation of another modified form in which the track portions are distorted or twisted transversely relative to the axis of the track, in order to present the planes of said track portions in surface contact with the respective members of the brake beam.

Figure 19 is a plan view of same.

Figure 20 is a vertical cross section taken on line 20—20 of Figure 18.

Figure 21 is a vertical cross section taken on line 21—21 of Figure 18.

Figure 22 is a modified form of strut showing the chair integral therewith.

Heretofore in the types of safety bars now in use, only the front end of the bar comes in contact with the beam and thus the beam is supported at its forward or tension end only. This serves to keep the top of the brake shoe from riding on the tread of the wheel but does not necessarily prevent the bottom of the shoe from riding the tread of the wheel, especially in cases where the front part of the support is too high.

In the device disclosed herein, the safety bar supports the brake beam both at the front end and the back end of the beam and the flexible bar coming in contact with the back part of the brake beam provides proper guidance at that part of the beam thereby eliminating the objectionable features above mentioned and insuring the proper operative maintenance of the brake rigging relative to the wheels of the truck. Furthermore, a more uniform application of the brake shoes to the treads of the wheels is thereby accomplished.

Referring by numerals to the accompanying drawings, and more particularly to Figures 1 to 10, inclusive, which illustrate the arrangement of the fourth point support, 10 indicates a spring plank forming part of the truck and fixed to said plank is a safety bar 11 the ends of which extend transversely therefrom below the compression member 12 and the tension member 14. Safety bar 11 is provided with an inclined sloping track portion 11ª on which is slidably supported compression member 12 and a sloping track portion 11ᵇ on which is slidably arranged tension member 14. The angles of inclination of these two portions are not the same, that of portion 11ª being more abrupt in order to correspond with the rise of compression member 12 whose vertical movement during the forward movement of the brake beam is greater than the vertical movement of the tension member 12. Thus the brake beam is supported at its rear or compression end as well as at its forward or tension end and is properly guided during its movement and the brake rigging associated with said beam is maintained at all times in proper operative relation with the wheels of the truck.

In the forms shown in Figures 1 and 2, the forward end of bar 11 or that portion constituting the track 11ᵇ is bent laterally so as to be positioned transversely relative to the axis of tension member 11.

In the form shown in Figures 3 to 5, the safety bar is not distorted laterally but the track portion 15ª is given a slight twist so that the upper face 15ᵇ of the track portion 15ª is properly disposed relative to the angularly disposed tension bar 14.

In the forms disclosed in Figures 1 to 5, the compression members 12 and the tension members 14 bear directly on the inclined track portions of the safety bar.

In the forms illustrated in Figures 6 to 10, inclusive, the compression members and the tension members are provided with sliding chairs or shoes detachably secured to said members.

In Figures 6 and 7, the sliding shoe 16 is secured by means of straps 17 and fastening devices 18 to compression member 12 and slidably rests on the inclined track portion 19ª of bar 19 and a shoe 20 is secured by means of straps 21 and fastening devices 22 to the tension member 14 and operates on the inclined track 19ᵇ of bar 19.

In Figures 8 and 9, the sliding shoe 16ª is provided with a downwardly and laterally extending portion or lip 16ᵇ which when said shoe rests on the track 19ª is arranged below said track and serves to prevent the accidental upward displacement of the compression member. Thus an open ended slot is formed by shoe 16ª and lip portion 16ᵇ which slot is arranged transversely of track portion 19ª thereby permitting easy disengagement of the chair from the safety bar.

In Figure 10, a sliding shoe 20ª secured to tension member 14 is provided with a transversely disposed lip portion 20ᵇ which is arranged below track portion 19ᵇ and prevents accidental upward movement of the tension member.

In Figures 11 and 12, a third point support arrangement is shown. The strut member 24 is secured at one end to compression member 12 and at its opposite end to tension member 14 and is provided at its compression end with a depending lug or shoe 25 which is adapted to slidably rest on the inclined track portion 26ª of the track 26. A sliding chair or shoe 27 is arranged on strut 24 and operates over an inclined track portion 26ᵇ of bar 26. While this chair 27 is shown as pivotally connected at 28 to the bifurcated nose extension 24ª of strut 24, if desired the chair or shoe 27 may rest on the strut itself or may be cast on the strut as shown in Figure 22. Thus said strut member is supported at both ends and the angles of inclination of the respective track portions are such as to properly guide the strut member in its forward movement and maintain it in proper position.

In Figure 13 a modified form of the strut is shown in which the sliding shoe 25 is provided with a depending transverse portion 25ª which extends below the inclined track portion 26ª and prevents the accidental displacement of said end of the strut.

In Figure 14 is shown a modified form of a support, wherein the sliding chairs 28 are formed integral with a member 29 which is clamped with a cooperating member 30, by means of suitable devices 31 to the respective parts of the brake beam. The safety bar forming the tracks for the brake beam may be formed flexible to provide resilient support for the brake beam or may be formed rigid as shown in Figure 14.

The modified form illustrated in Figures 15 to 17 inclusive, shows a track member 34 having inclined track portions 34ª and 34ᵇ, both of which are formed divergent in opposite directions in order to place them at right angles to the respective angularly disposed members of the brake beam so as to engage the same along their lines of intersection instead of at a single point.

In Figures 18 to 21, inclusive, the track portions 34ª of track member are twisted or distorted in order to present their planes transversely at an angle to the surface of the remaining portion of track member. Thus while the track extends in a straight line from the spring plank, it still has its track portion arranged to form surface contact with the respective members of the brake beam.

The surface contact of the brake beam with the respective track portions permits even wear of the parts and insures better and more accurate maintenance of the brake rigging relative to the wheels of the truck.

Obviously, still other modifications and adaptations in the embodiment of my invention may be made, other than those herein illustrated and described, without departing from the spirit of the invention.

I claim:

1. A safety bar support for brake beams comprising a member having a plurality of track portions inclined from horizontal for engaging and supporting the brake beam at a plurality of points, the plane of one of said track portions being inclined transversely to form surface contact with the angularly disposed part of the brake beam.

2. A support for brake beams comprising a member having a plurality of track portions, inclined from horizontal and having different degrees of inclination relative to each other for maintaining the brake beam at all times in supporting engagement with said track portions, each of which is distorted in order to form surface contact with the corresponding angularly disposed part of the brake beam.

3. A safety support for brake beams comprising a single-piece bar adapted to be secured to a car truck part and having a plurality of track portions inclined from horizontal and in the same direction for engaging and supporting a brake beam at a plurality of points.

4. A safety support for brake beams comprising a single piece bar adapted to be secured to a car truck part and having a plurality of track portions inclined from horizontal for engaging and supporting a brake beam at a plurality of points, said track portions having different degrees of inclination for causing tilting of said brake beam during the operative movement thereof.

5. In combination with a trussed brake beam, a safety bar adapted to be secured to a car truck part and underlying said brake beam and provided with a plurality of track portions inclined from horizontal for slidably supporting said brake beam adjacent to the compression member and the tension member thereof.

6. In combination with a trussed brake beam, a safety bar adapted to be secured to a car truck part and underlying said brake beam and provided with a plurality of track portions inclined from horizontal for slidably supporting said brake beam adjacent to the compression member and the tension member thereof, the outer track portion being distorted transversely to form a plane contact with said tension member.

7. In a car construction, the combination with a trussed brake beam and a car truck part, of a safety bar secured to said car truck part and underlying said brake beam, said safety bar being provided with a plurality of truck portions inclined from horizontal for slidably engaging said brake beam at points coincident with the compression member and the tension member thereof, said track portions having different degrees of inclinations for insuring the proper disposition of the brake beam relative to the wheels of the truck at all times.

8. A safety bar for brake beams comprising a single piece bar having a plurality of track portions inclined from horizontal and in the same direction for slidably supporting a brake beam at points coincident with the compression and tension members thereof, said track portions having different degrees of inclination relative to each other for tilting the brake beam during the operative movement thereof.

In testimony whereof I hereunto affix my signature this eleventh day of August, 1923.

A. CLARK MOORE.